US008332589B2

(12) United States Patent
Beardsley et al.

(10) Patent No.: US 8,332,589 B2
(45) Date of Patent: Dec. 11, 2012

(54) MANAGEMENT OF WRITE CACHE USING STRIDE OBJECTS

(75) Inventors: Brent C. Beardsley, Tucson, AZ (US); Michael T. Benhase, Tucson, AZ (US); Lokesh M. Gupta, Tucson, AZ (US); Joseph S. Hyde, II, Tucson, AZ (US); Sonny E. Williams, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 12/894,019

(22) Filed: Sep. 29, 2010

(65) Prior Publication Data

US 2012/0079187 A1 Mar. 29, 2012

(51) Int. Cl.
*G06F 12/00* (2006.01)
(52) U.S. Cl. .......... 711/133; 711/135; 711/159
(58) Field of Classification Search .......... 711/113, 711/133, 135, 159
See application file for complete search history.

(56) References Cited

U.S. PATENT DOCUMENTS

| | | | |
|---|---|---|---|
| 5,542,066 A | 7/1996 | Mattson et al. | |
| 6,192,450 B1 | 2/2001 | Bauman et al. | |
| 6,738,865 B1 | 5/2004 | Burton et al. | |
| 6,785,771 B2 | 8/2004 | Ash et al. | |
| 7,080,208 B2 | 7/2006 | Ashmore et al. | |
| 7,260,679 B2 | 8/2007 | Benhase et al. | |
| 7,496,714 B2 | 2/2009 | Gill et al. | |

OTHER PUBLICATIONS

Marina Alonso et al., "A New Destage Algorithm for Disk Cache: DOME," IEEE Proceedings 25th Euromicro Conference, 1999, vol. 1, Sep. 1999, pp. 416-423.

Anujan Varma et al., "Destage Algorithms doe Disk Arrays with Non-Volatile Caches", IEEE Proceedings, 22nd Annual International Symposium on Computer Architecture, Jun. 1995, pp. 83-95.

IBM, "Efficient Method for Destaging Tracks with Holes for RAID Arrays with Write Penalty", IP.com No. IPCOM000177514D, Dec. 16, 2008, 3 pages.

IBM, "A system and method of destaging transient data for optimal performance", IP.com No. IPCOM000183036D, May 12, 2009, 3 pages.

*Primary Examiner* — Yaima Campos
*Assistant Examiner* — Hamdy S Ahmed
(74) *Attorney, Agent, or Firm* — Griffiths & Seaton PLLC

(57) ABSTRACT

Method, system, and computer program product embodiments for, in a computing storage environment for destaging data from nonvolatile storage (NVS) to a storage unit, identifying working data on a stride basis by a processor device are provided. A multi-update bit is established for each stride in a modified cache. The multi-update bit is adapted to indicate at least one track in a working set. A schedule of destage scans is configured based on a plurality of levels of urgency. A destage operation is performed based on at least one of a number of strides examined by the destage scans, whether the multi-update bit is set, and whether an emergency level of the plurality of levels of urgency is active.

21 Claims, 4 Drawing Sheets

MANAGEMENT OF WRITE CACHE USING STRIDE OBJECTS

BACKGROUND OF THE INVENTION

1. Field of the Invention

The present invention relates in general to computers, and more particularly to a method, system, and computer program product for identification of working data and management of a write cache using stride objects in a computing storage environment.

2. Description of the Related Art

In enterprise data processing arrangements, such as may be used in a company, government agency or other entity, information is often stored on servers and accessed by users over, for example, a network. The information may comprise any type of information that of programs and/or data to be processed. Users, using their personal computers, workstations, or the like (generally, "computers") will enable their computers to retrieve information to be processed, and, in addition, to store information, for example, on remote servers.

Generally, servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. To provide redundancy and increase performance, many storage devices may be configured in a redundant array of independent disks (RAID) topology, where storage volumes are organized in RAID ranks.

A computer network of a business may have multiple storage networks that are located remote from one another and a business user. The storage networks may also be hosted on different types of systems. To perform the job correctly, the business user may require fast and reliable access to the data contained in all of the storage networks. Since access to this data occurs in real time, is desirable that storage operations (such as write or reads) occur as quickly as possible.

SUMMARY OF THE INVENTION

To move data, mass storage subsystems destage data from Non-Volatile Storage (NVS) to the RAID devices, for example. Current management of a write cache, operational in mass storage subsystems in conjunction with the RAID and NVS devices, may cause wastage of Central Processing Unit (CPU) cycles as the system performs duplicative destage scan operations as will be further described. A need exists for a mechanism to reduce or eliminate wastage of CPU cycles in certain situations, again as will be further described.

In view of the foregoing, various method, system, and computer program product embodiments for, in a computing storage environment for destaging data from nonvolatile storage (NVS) to a storage unit, identifying working data on a stride basis by a processor device are provided. In one embodiment, by way of example only, a multi-update bit is established for each stride in a modified cache. The multi-update bit is adapted to indicate at least one track in a working set. A schedule of destage scans is configured based on a plurality of levels of urgency. A destage operation is performed based on at least one of a number of strides examined by the destage scans, whether the multi-update bit is set, and whether an emergency level of the plurality of levels of urgency is active.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below describe efficient and highly scalable mechanisms for identification of working sets of tracks that are updated frequently, and management of the write cache using stride objects as will be further described in more detail. These mechanisms use management techniques focusing on a per-stride basis, rather than examination and management on a per-track basis. In this regard, CPU waste is reduced and/or eliminated because fewer objects must be examined, for example. Further, in one of the illustrated embodiments, a multi-update bit is established for identification of the working sets discussed previously.

Figure 1:
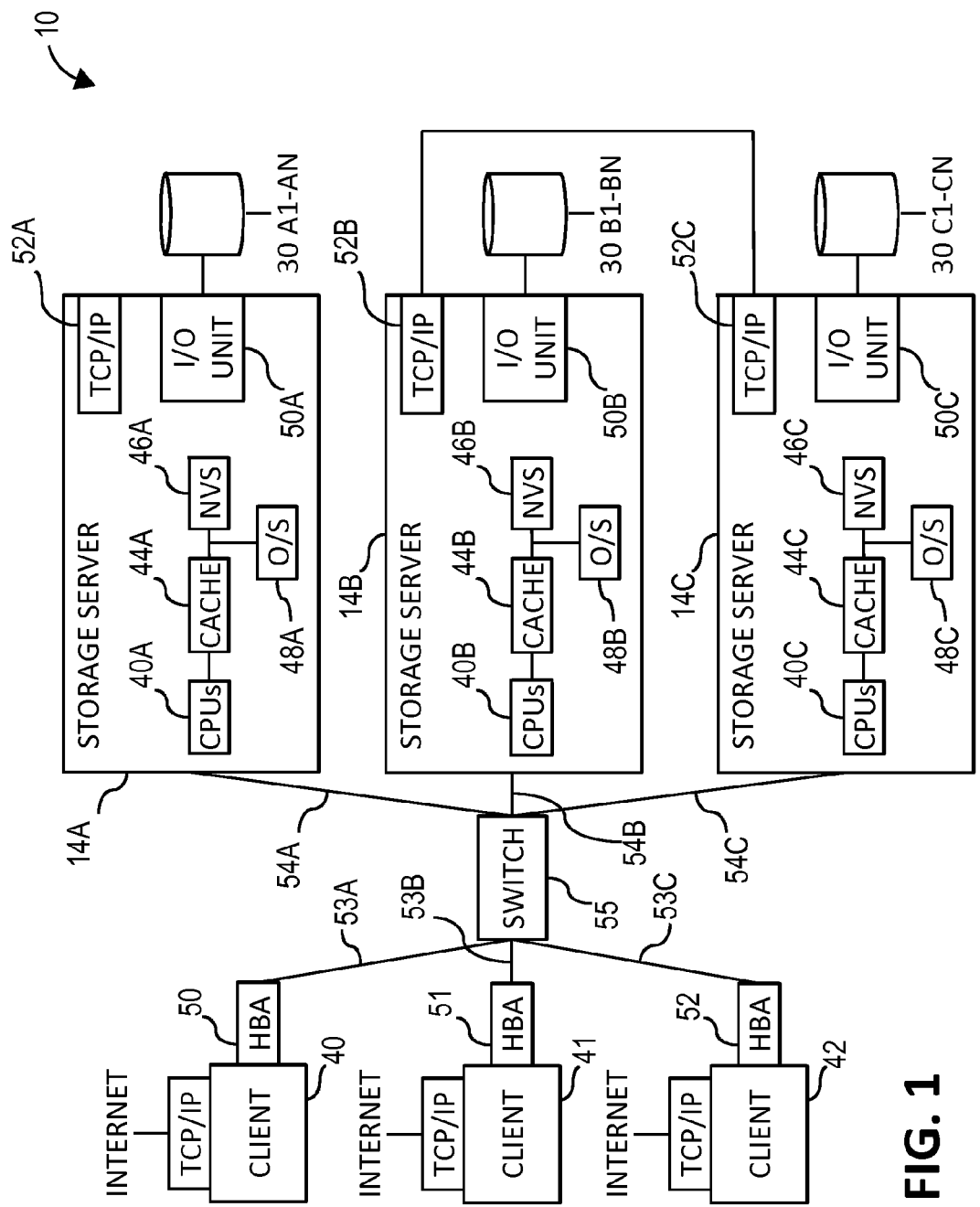
FIG. 1 is a block diagram of a distributed computer system including storage servers and a storage management server, in which aspects of the following description and claimed subject matter may be implemented.

FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 illustrates an exemplary distributed computer system generally designated 10 which includes the present invention. System 10 comprises multiple, similar storage servers/controllers 14a,b,c with multiple CPUs 40a,b,c per cluster (See FIG. 2, following, for CPU organization in each cluster), cache 44a,b,c, nonvolatile storage ("NVS") 46a,b,c, operating system 48a,b,c, I/O unit 50a,b,c, and TCP/IP adapter card 52a,b,c. Each of the storage servers 14a,b,c manages storage allocation and access to multiple storage devices (such as disks) 30a1-an, 30b1-bn, and 30c1-cn, respectively, by clients 40, 41 and 42.

CPUs 40, 41 and 42 have adapter cards 50, 51 and 52, such as a Fibre Channel adapter cards, for connection via a communication path 53a,b,c, such as a Fibre Channel, to a switch 55. Switch 55 can be coupled to storage servers 14a,b,c via host busses 54a,b,c, and can forward a request from any of the clients 40, 41 or 42 to any of the storage servers 14a,b,c as configured on the client. An administrator has allocated to each of the clients 40, 41 and 42 a number of storage "volumes." Each "volume" resides on a storage array. A "storage array" can comprise one or more storage devices and be configured in a variety of RAID levels such as RAID 5, RAID 10 or Just a Bunch of Disks (commonly referred to as JBOD).

Figure 2:
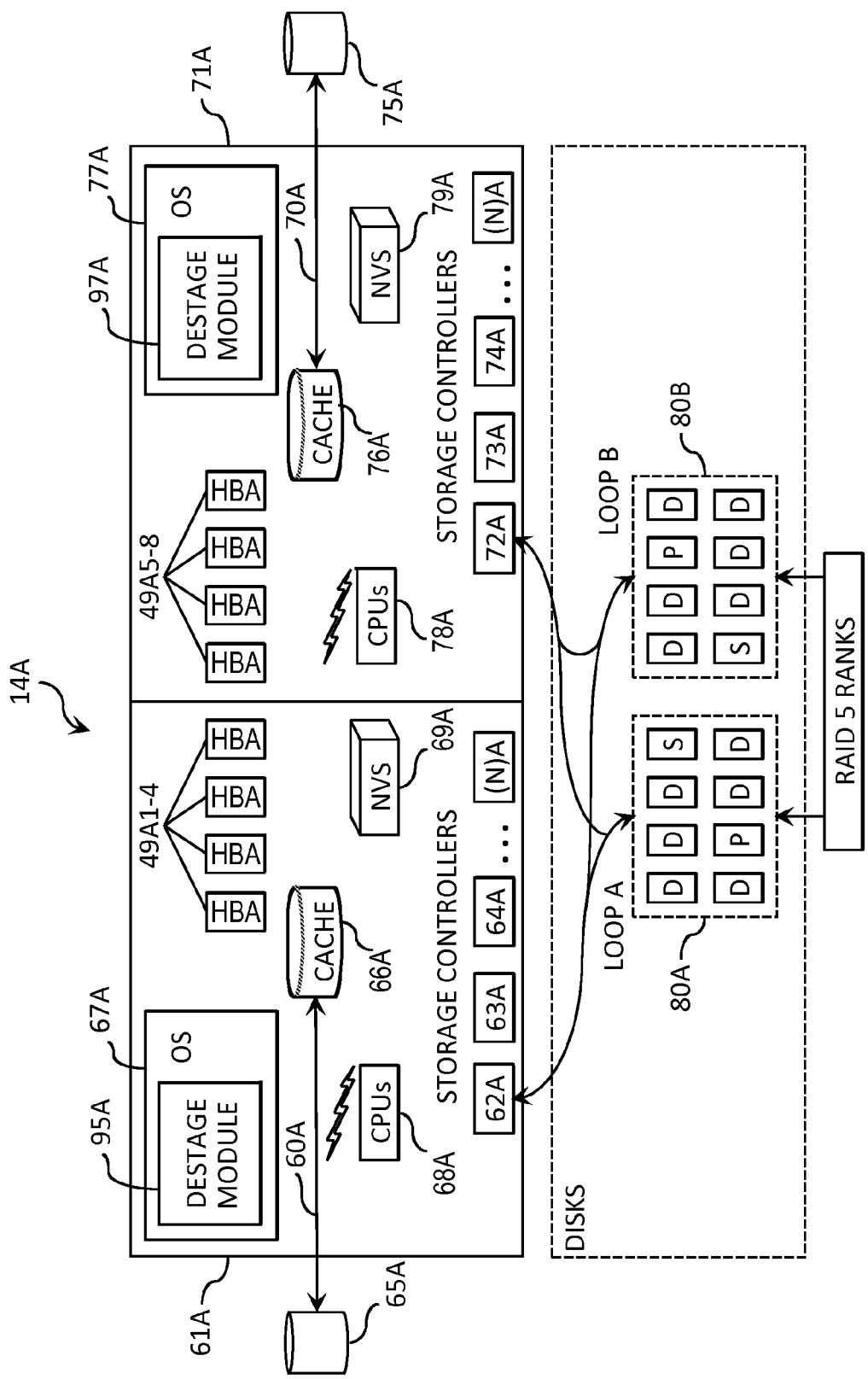
FIG. 2 is a block diagram of one of the storage servers of FIG. 1.

In the exemplary embodiment illustrated in FIG. 2, storage controller 14a (and likewise storage controller 14b and c) includes two identical clusters 61a and 71a of CPUs 68a and 78a, cache 66a and 76a, NVS 69a and 79a, and any number of pairs of device adapters (62a-(N)a and 72a-(N)a per cluster). There is a shared cache (semiconductor) memory 66a and 76a for each cluster 61a and 71a, respectively. Cache 66a and 76a each contain a directory of tracks stored on each cache, respectively. The directory includes any number of directory entries associated with each of the tracks.

Each cluster also contains battery backed-up storage 69a and 79a (also called "NVS"). In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays.

NVS 69a and 79a are interconnected with disks 65a and 75a via communication links 60a and 70a, respectively. In certain embodiments, communication links 60a and 70a are selected from a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, disks 65a and 75a comprise one or more optical storage media, one or more magnetic storage media, one or more electronic storage media, and combinations thereof. In certain embodiments, disks 65a and 75a are external to clusters 61a and 71a. In certain embodiments, disks 65a and 75a are internal to clusters 61a and 71a.

When the client requests access to storage, i.e. to read from or write to data in one of the volumes allocated to the client, then the storage cluster that manages that volume will process the request, i.e. temporarily store client updates into the cache memory and NVS (if the request is a write) on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 2, server 14a is shown including operating systems 67a and 77a, one for each cluster. As one of ordinary skill in the art will appreciate, operating systems 67a and 77a may be physically or virtually placed in a variety of locations. For purposes of illustration, the operating systems 67a and 77a are shown incorporated into each cluster as shown. In one embodiment, CPUs 68a and 78a may execute portions of the operating systems 67a and 77a. Each operating system 67a and 77a includes destage modules 95a, 97a, as is shown. In one embodiment, destage modules 95a and 97a may operate to implement various aspects of the present invention, in conjunction with the operating systems 67a and 77a, the depicted CPUs, cache memory, NVS, etc., such as performing destage scans and destage operations as will be further described. While destage modules 95a and 97a are shown incorporated into the operating systems 67a and 77a, one of ordinary skill in the art will appreciate that the destage modules 95a and 97a may be physically or logically located elsewhere, yet remain in communication with the depicted CPUs, cache memory, NVS, etc. Additional functionality of destage modules 95a and 97a will be further described, following.

In one of the illustrated embodiments of the present invention, the distributed computing environment and storage server depicted in FIGS. 1 and 2, previously, may use various mechanisms to manage the cache memory, NVS, and perform destage scans and destage operations, for example. One mechanism demotes tracks based on a least recently used (LRU)-based methodology, and maintains a temporal bit per track. The temporal bit is set when a host writes tracks. The temporal bit is reset when a destage scan examines a track having a temporal bit set. If the destage scan finds strides with no tracks having a temporal bit set, these tracks may be selected for destage. Another mechanism demotes tracks based on spatial location. A sorted list of tracks is maintained using a balanced tree. Destage scans looking for tracks to destage may traverse the balanced tree in the order of track location from lowest to highest, for example.

As previously described, a "working set" may be intended to refer to a group of tracks that are updated frequently. Currently no mechanism exists to detect working sets in the cache memory. As a result, these tracks may be destaged multiple times. It is preferable that working sets not be destaged as long as they are being constantly updated in the write cache. Accordingly, a need exists for a mechanism to identify working sets and prevent them from being destaged. If the write cache is filled with tracks that a part of a working set, these tracks will often have their associated temporal bit set. Current mechanisms that perform destage scans that examine these tracks (having an associated temporal bit set) will skip these tracks. As a result, wasted CPU cycles may be incurred as the destage scan repeatedly scans and skips these tracks. A need exists for a mechanism to reduce or eliminate CPU cycle wastage when the cache memory is filled with these tracks, as previously described.

Again, as previously described, the mechanisms of the present invention change the objects traversed from a per-track basis to a stripe basis (i.e., the sorted list of tracks is maintained based on stride instead of tracks). This reduces waste of CPU cycles since fewer objects need be examined. Additionally, and again as previously described, a multi-update bit is established per stride. This bit is used to identify working sets in cache. Finally, working sets are not destaged unless in cases of emergency when the NVS is full, as will be described, following. These mechanisms reduce CPU cycles taken for destage scans and improve performance of associated storage controllers. Additionally, the mechanisms prevent working sets from being destaged, improving the data throughput of associated storage controllers.

Figure 3:
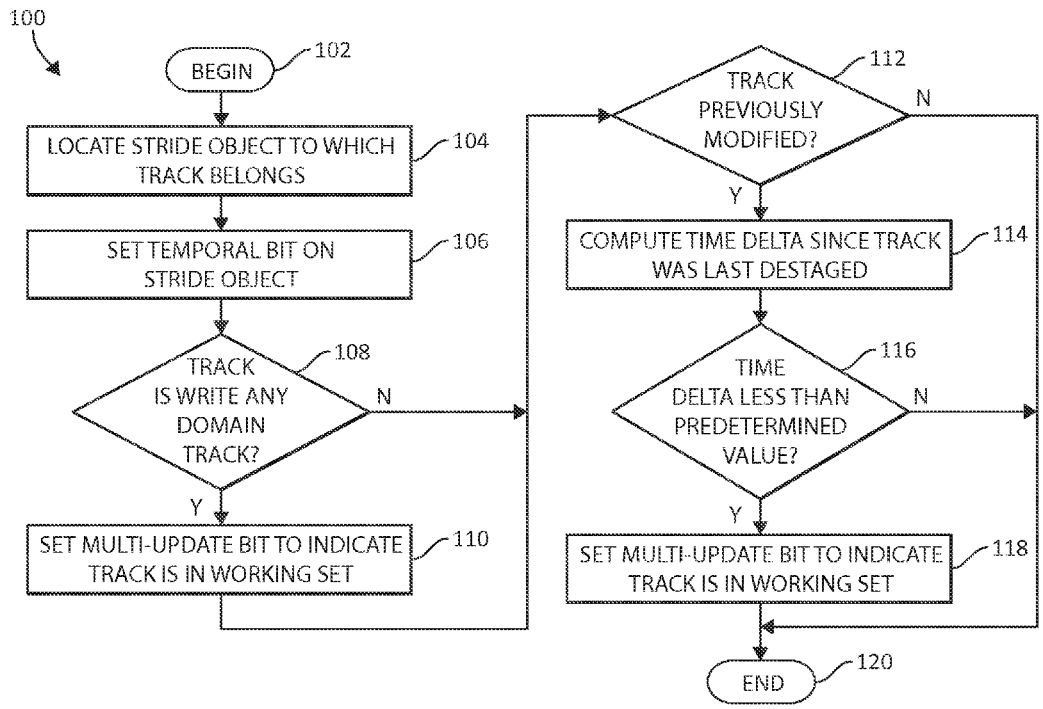
FIG. 3 is a flow chart diagram of an exemplary method for facilitating identification of working data on a stride basis according to various aspects of the present invention.

FIG. 3, following, illustrates an exemplary method 100 for performing a host write to a particular track operation incorporating various aspects of the present invention for cache management and identification of working sets as previously described. Method 100 begins (step 102), by locating a stride object to which a particular track to be written to belongs (step 104). The associated temporal bit is then set on the stride object (step 106). In the depicted embodiment, if the track is identified as a Write Any Domain Track (IMS WADS) (step 108), then a multi-update bit is set to indicate the track is in a working set (step 110). Alternatively, the track is examined to determine if the track has been previously modified (step 112).

If the track is determined to have been previously modified, the time delta between the present time and the time the track was last destaged is computed (step 114). If the time delta is less than a predetermined value (such as less than 250 ms in one exemplary embodiment) (step 116), the multi-update bit is set to indicate the track is in a working set (step 118). The method 100 then ends (step 120). Returning to step 112, if the track has not been previously modified, the method 100 ends (again, step 120). Returning to step 116, if the time delta is not less than the predetermined value, the method ends (again, step 120).

Figure 4:
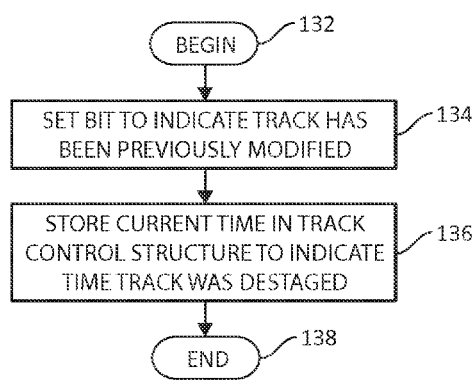
FIG. 4 is a flow chart diagram of an exemplary method for destage completion according to various aspects of the present invention.

FIG. 4, following, illustrates an exemplary method 130 following completion of a destage operation to move data of a particular track to an associated storage unit, and again incorporates various aspects of the present invention and following claimed subject matter. Method 130 begins (step 132) by setting a bit for the associated track to indicate that the track has been previously modified (step 134). As a following step, the current time is stored in the track control structure to indicate the time the track was destaged (step 134). The method 130 then ends (step 138).

As previously described, the frequency of associated destage scans may be limited to reduce wastage of CPU cycles. In one embodiment, the destage scans may be limited based on how quickly the scans may cycle through a rank ring. This metric may be checked when cycling from an end to a beginning of an associated rank. The frequency of performing destage scans on a modified list of tracks for a rank may be limited, in one embodiment, as follows. A series of levels of "urgency" for performing destage scans may be established. In one embodiment, four levels of urgency for destage scans, defined as (1) low, (2), medium, (3) high, and (4), emergency may be established. These levels of urgency may be determined by the current occupancy of NVS by the associated rank and the total NVS occupancy by all ranks.

Consider the following example based on the foregoing embodiment establishing four levels of urgency for destage scans. In the present example, the urgency level may be defined as low when the NVS current occupancy is less than 50% full, and NVS occupancy for the rank is 50% allowed for the rank. Similarly, the urgency level may be defined as medium when the NVS current occupancy is between 50% and 70% full or NVS occupancy for the rank is between 50% and 70% allowed for the rank. Similarly, the urgency level may be defined as high when the NVS current occupancy is between 70% and 90% full or NVS occupancy for the rank is between 70% and 90% allowed for the rank. Finally, the urgency level may be defined as emergency when the NVS is greater than 90% full or the NVS occupancy for the rank is more than 90% allowed for the rank.

Keeping the foregoing definitions in mind, in one embodiment, the destage scans for an associated modified list of tracks may be limited according to the particular urgency level currently active. For example, destage scans may be limited as once in 10 seconds when urgency is low, once in 5 seconds when urgency is medium, once in 1 seconds when urgency is high and unlimited when the urgency is emergency. Of course, one of ordinary skill in the art will appreciate that the definitions of levels of urgency, statistical requirements for each level, and limitations performed on destage operations may be varied according to a particular implementation and/or application.

Figure 5:
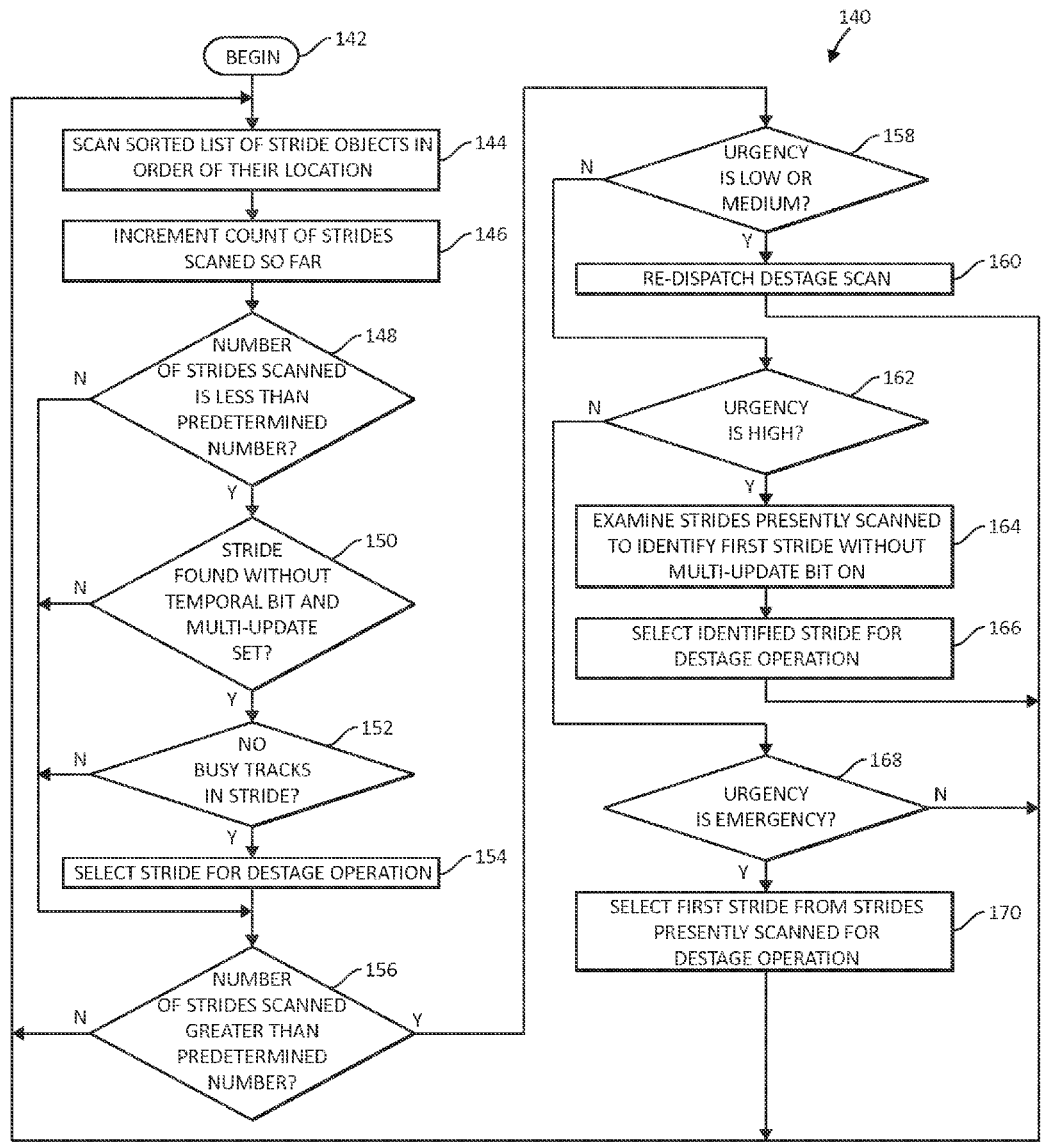
FIG. 5 is a flow chart diagram of an exemplary method for performing destage scan operations according to various aspects of the present invention.

In view of the foregoing, FIG. 5, following, is an exemplary method 140 for performing destage operations incorporating various aspects of the present invention (including levels of urgency as previously indicated). Method 140 begins (step 142) by scanning the sorted list of stride objects in order of their location (step 144). The count of strides scanned so far is incremented (step 146). If the number of strides scanned is less than a predetermined number (step 148), and a stride is located having the temporal bit and multi-update bit clear (step 150), and without busy tracks (step 152), this stride is selected for a destage operation (step 154). As a following step, and alternatively, in steps 148, 150, and 152, if this is not the case, the method moves to step 156.

Step 156 queries if the number of strides scanned so far is greater than the predetermined number. If this is not the case, the method 140 moves to step 144 to scan additional strides. If this is the case, the method 140 queries if the urgency is low or medium (step 158). If so, the destage scan is re-dispatched to another thread (step 160). If not, the method 140 queries if the urgency is high (step 162). If so, the strides scanned so far are re-examined to locate the first stride without the multi-update bit set (step 164). This identified stride is selected for the destage operation (step 166).

Returning to step 162, if the urgency level is not high, the method 140 queries if the urgency is emergency (step 168). If so, the first strides from strides scanned so far is selected for the destage operation (step 170), and the method returns to step 144 to scan additional strides as necessary.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. In a computing storage environment for destaging data from nonvolatile storage (NVS) to a storage unit, a method for identifying working data on a stride basis by a processor device, comprising:
    establishing a multi-update bit for each stride of a plurality of strides in a modified cache, wherein the multi-update bit is adapted to indicate a corresponding stride is part of at least one track in a working set, the working set referring to a group of frequently updated tracks;
    configuring a schedule for scanning the plurality of strides, the schedule being based on a plurality of levels of urgency, wherein the plurality of levels of urgency are active or inactive and include a low level during which destage scans are formed at a first frequency and an emergency level during which destage scans are formed at a second frequency that is more frequent than the first frequency;
    scanning the plurality of strides based on the schedule to identify one or more tracks for destaging; and
    performing an operation to destage on a selected track identified during the scanning, if the multi-update bit of a selected stride on the selected track is set to indicate the selected track is part of the working set and if the emergency level of the plurality of levels of urgency is active.

2. The method of claim 1, wherein establishing the multi-update bit includes:
    for a host write operation for a track, locating a stride object to which the track belongs, and
    if the track is designated as a Write Any Domain Track (IMS WADS), setting the multi-update bit.

3. The method of claim 2, wherein establishing the multi-update bit further includes, on a host write:
    if the track is determined to be previously modified, computing a time delta since the track was last destaged, and
    if the time delta is less than a predetermined value, setting the multi-update bit.

4. The method of claim 3, further including performing at least one of:
    subsequent to a destage of the track, setting an additional bit to indicate the track had been previously modified, and
    storing a current time in a track control structure to indicate a time the track was destaged.

5. The method of claim 1, wherein configuring the schedule includes coordinating each of the plurality of levels of urgency to correspond to at least one of a current occupancy of the NVS by a rank and a total allowable NVS occupancy by all ranks in the NVS.

6. The method of claim 1, wherein performing the operation includes, pursuant to one of the destage scans:
    incrementing the number of strides, and
    if the number of strides is less than a predetermined number, and a stride is located having a clear temporal bit, a clear multi-update bit, and no busy tracks, selecting the stride for the destage operation.

7. The method of claim 1, wherein performing the operation includes, pursuant to one of the destage scans, if the number of strides is greater than a predetermined number, examining an urgency level of the plurality of levels, wherein:
if the urgency level is the low level, re-dispatching the one of the destage scans,
if the urgency level is a higher urgency level than the low level and lower than the emergency level, selecting a stride of a plurality of strides presently scanned for the destage operation having a clear multi-update bit, and
if the urgency level is the emergency level, selecting a first stride of the plurality of strides presently scanned for the destage operation.

8. In a computing storage environment for destaging data from nonvolatile storage (NVS) to a storage unit, a system for identifying working data on a stride basis, comprising:
a processor device operable in the computing storage environment, wherein the processor device is adapted for performing at least one of:
establishing a multi-update bit for each stride of a plurality of strides in a modified cache, wherein the multi-update bit is adapted to indicate the corresponding stride is part of at least one track in a working set, the working set referring to a group of frequently updated tracks;
configuring a schedule for scanning the plurality of strides, the schedule being based on a plurality of levels of urgency, wherein the plurality of levels of urgency are active or inactive and include a low level during which destage scans are formed at a first frequency and an emergency level during which destage scans are formed at a second frequency that is more frequent than the first frequency;
scanning the plurality of strides based on the schedule to identify one or more tracks for destaging; and
performing an operation to destage on a selected track identified during the scanning, if the multi-update bit of a selected stride on the selected track is set to indicate the selected track is part of the working set and if the emergency level of the plurality of levels of urgency is active.

9. The system of claim 8, wherein the processor device is further adapted for, pursuant to establishing the multi-update bit:
for a host write operation for a track, locating a stride object to which the track belongs, and
if the track is designated as a Write Any Domain Track (IMS WADS), setting the multi-update bit.

10. The system of claim 9, wherein the processor device is further adapted for, pursuant to establishing the multi-update bit on a host write:
if the track is determined to be previously modified, computing a time delta since the track was last destaged, and
if the time delta is less than a predetermined value, setting the multi-update bit.

11. The system of claim 10, wherein the processor device is further adapted for performing at least one of:
subsequent to a destage of the track, setting an additional bit to indicate the track had been previously modified, and
storing a current time in a track control structure to indicate a time the track was destaged.

12. The system of claim 8, wherein the processor device is further adapted for, pursuant to configuring the schedule, coordinating each of the plurality of levels of urgency to correspond to at least one of a current occupancy of the NVS by a rank and a total allowable NVS occupancy by all ranks in the NVS.

13. The system of claim 8, wherein the processor device is further adapted for, pursuant to performing the operation, pursuant to one of the destage scans:
incrementing the number of strides, and
if the number of strides is less than a predetermined number, and a stride is located having a clear temporal bit, a clear multi-update bit, and no busy tracks, selecting the stride for the destage operation.

14. The system of claim 8, wherein the processor device is further adapted for, pursuant to performing the operation, if the number of strides is greater than a predetermined number, examining an urgency level of the plurality of levels, wherein:
if the urgency level is the low level, re-dispatching the one of the destage scans,
if the urgency level is a higher urgency level than the low level and lower than the emergency level, selecting a stride of a plurality of strides presently scanned for the destage operation having a clear multi-update bit, and
if the urgency level is the emergency level, selecting a first stride of the plurality of strides presently scanned for the destage operation.

15. A computer program product for, in a computing storage environment for destaging data from nonvolatile storage (NVS) to a storage unit, identifying working data on a stride basis by a processor device, the computer program product comprising a non-transitory computer-readable storage medium having computer-readable program code portions stored therein, the computer-readable program code portions comprising:
a first executable portion for establishing a multi-update bit for each stride of a plurality of strides in a modified cache, wherein the multi-update bit is adapted to indicate at least one track in a working set, the working set referring to a group of frequently updated tracks;
a second executable portion for configuring a schedule for scanning the plurality of strides, the schedule being based on a plurality of levels of urgency, wherein the plurality of levels of urgency are active or inactive and include a low level during which destage scans are formed at a first frequency and an emergency level during which destage scans are formed at a second frequency that is more frequent than the first frequency;
a third executable portion for scanning the plurality of strides based on the schedule to identify one or more tracks for destaging and
a fourth executable portion for performing an operation to destage on a selected track identified during the scanning, if the multi-update bit of a selected stride on the selected track is set to indicate the selected track is part of the working set and if the emergency level of the plurality of levels of urgency is active.

16. The computer program product of claim 15, further including a fifth executable portion for, pursuant to establishing the multi-update bit:
for a host write operation for a track, locating a stride object to which the track belongs, and
if the track is designated as a Write Any Domain Track (IMS WADS), setting the multi-update bit.

17. The computer program product of claim 16, further including a sixth executable portion for, pursuant to establishing the multi-update bit, on a host write:
if the track is determined to be previously modified, computing a time delta since the track was last destaged, and if the time delta is less than a predetermined value, setting the multi-update bit.

18. The computer program product of claim 17, further including a seventh executable portion for performing at least one of:

subsequent to a destage of the track, setting an additional bit to indicate the track had been previously modified, and storing a current time in a track control structure to indicate a time the track was destaged.

19. The computer program product of claim 15, further including a fifth executable portion for, pursuant to configuring the schedule of scans coordinating each of the plurality of levels of urgency to correspond to at least one of a current occupancy of the NVS by a rank and a total allowable NVS occupancy by all ranks in the NVS.

20. The computer program product of claim 15, further including a fifth executable portion for, pursuant to performing the operation, further pursuant to one of the destage scans:

incrementing the number of strides, and if the number of strides is less than a predetermined number, and a stride is located having a clear temporal bit, a clear multi-update bit, and no busy tracks, selecting the stride for the destage operation.

21. The computer program product of claim 15, further including a fifth executable portion for, pursuant to performing the operation, further pursuant to one of the destage scans, if the number of strides is greater than a predetermined number, examining an urgency level of the plurality of levels, wherein:

if the urgency level is the low level, re-dispatching the one of the destage scans, if the urgency level is a higher urgency level than the low level and lower tan the emergency level, selecting a stride of a plurality of strides presently scanned for the destage operation having a clear multi-update bit, and if the urgency level is the emergency level, selecting a first stride of the plurality of strides presently scanned for the destage operation.

* * * * *